US006749809B2

(12) United States Patent
Karasawa

(10) Patent No.: US 6,749,809 B2
(45) Date of Patent: Jun. 15, 2004

(54) CLUSTERED CREATURE EXTERMINATING METHOD

(75) Inventor: Yukihiko Karasawa, Saitama (JP)

(73) Assignee: Karasawa Fine, Ltd., Saitama (JP)

( * ) Notice: Subject to any disclaimer, the term of this patent is extended or adjusted under 35 U.S.C. 154(b) by 0 days.

(21) Appl. No.: 09/954,241

(22) Filed: Sep. 17, 2001

(65) Prior Publication Data

US 2002/0032981 A1 Mar. 21, 2002

(30) Foreign Application Priority Data

Sep. 21, 2000 (JP) ....................................... 2000-286499

(51) Int. Cl.[7] .................................................. A61L 2/02

(52) U.S. Cl. ................................ 422/39; 422/1; 422/6; 422/33; 422/41

(58) Field of Search ........................... 422/1, 6, 33, 39, 422/41; 210/90, 96.1, 188, 748

(56) References Cited

U.S. PATENT DOCUMENTS

| | | | | | |
|---|---|---|---|---|---|
| 1,355,476 | A | * | 10/1920 | Hering | 422/39 |
| 2,374,805 | A | * | 5/1945 | Camelford | 422/39 |
| 5,435,913 | A | * | 7/1995 | Ashbrook | 210/188 |
| 5,494,585 | A | * | 2/1996 | Cox | 210/195.1 |
| 6,120,732 | A | * | 9/2000 | Toledo et al. | 422/39 |
| 2002/0096456 | A1 | * | 7/2002 | Kim et al. | 210/90 |

FOREIGN PATENT DOCUMENTS

| | | | | |
|---|---|---|---|---|
| JP | 11138175 | A | * | 5/1999 |
| JP | 11300337 | A | * | 11/1999 |
| JP | 2000325727 | A | * | 11/2000 |

* cited by examiner

*Primary Examiner*—Robert J. Warden, Sr.
*Assistant Examiner*—Sean E. Conley
(74) *Attorney, Agent, or Firm*—Muramatsu & Associates

(57) ABSTRACT

A clustered creature exterminating method efficiently exterminates clustered creature such as cyanobacteria in large quantity with use of a pressure which is substantially lower than that of the conventional method. The exterminating method includes the steps of: pressurizing a fluid containing a clustered creature such as cyanobacteria through a pump; suddenly lowering the pressure applied to the fluid by injecting the fluid from nozzle groups; and destroying a bonding in the clustered creature by a cavitation caused by the pressure drop. The nozzle groups may be arranged to oppose to one another to collide the injected fluids with each other, which divides the cyanobacteria into many small pieces. As a result, the cyanobacteria lose the ability to rise, and sink at the bottom of water, therefore, die because they cannot photosynthesize.

4 Claims, 1 Drawing Sheet

CLUSTERED CREATURE EXTERMINATING METHOD

FIELD OF THE INVENTION

The present invention relates to a method of exterminating a noxious clustered creature such as cyanobacteria (mycrocystis) that are generated at ponds, lakes or marshes.

BACKGROUND OF THE INVENTION

It is known that cyanobacteria grow at ponds, lakes or marshes, and sometimes propagate themselves in large quantities to damage environment, for instance, they kill a large number of fishes and shellfishes and pollute water. These cyanobacteria are one kind of a fresh water algae, and each individual is a globular unicellular organism with a diameter from 3 to 6 μm. However, many unicellular organisms are close to each other and are sheathed by a viscous sheath so as to be a cluster with globular or substantially globular form.

A gas cyst in the cell functions as a float, and the cyanobacteria rise near the water surface and suspend there. Cyanobacteria have a chloroplast in their cell, and their suspending near the water surface allows them to receive sunlight to photosynthesize. As a result, cyanobacteria are able to maintain their life and propagate themselves.

As described above, since cyanobacteria sometimes propagates themselves in large quantities to kill a large number of fishes and shellfishes and pollute water, it has been a vital problem how to exterminate cyanobacteria to prevent water pollution.

In order to exterminate cyanobacteria, following methods have been implemented or proposed: (1) blowing ozone into water and making cyanobacteria contact to the ozone; (2) making water containing cyanobacteria pass a narrow passage that is enclosed by transparent glass plates or the like, and irradiating ultraviolet rays to the water passing the passage; (3) generating babbles in water to divide clustered cyanobacteria; (4) agitating water with an underwater fan or the like to divide clustered cyanobacteria; (5) absorbing cyanobacteria to zeolite and processing the cyanobacteria by plankton or the like; (6) absorbing cyanobacteria to charcoal and processing the cyanobacteria by plankton and so on.

With the methods (1) and (2), cells of cyanobacteria can be destroyed securely; on the other hand, it is dangerous and difficult to handle ozone and ultraviolet rays. In addition to the above, the quantity of cyanobacteria that can be exterminated is very small, so that it is impossible to catch up with the propagation of cyanobacteria. Further, other planktons also die. And, both initial and running costs of these methods are high.

The methods (3) and (4) have the advantage that an apparatus used for the methods is simple, however, these methods lack reliability of extermination of cyanobacteria. That is, there is a fear that nutriments for cyanobacteria are scraped out of the ground under the water and are agitated in the water, which promotes the propagation of the cyanobacteria.

Next, the methods (5) and (6) have the advantage that an apparatus used for the methods becomes simple and they contribute to environmental protection, however, the quantity of cyanobacteria that can be exterminated is small, which makes it difficult to catch up with the propagation of cyanobacteria. Especially, zeolite sinks near the bottom of the water, and a suction spout of charcoal is also positioned near the bottom of the water. On the contrary, since the cyanobacteria stay near the water surface, zeolite and charcoal do not absorb cyanobacteria very much.

SUMMARY OF THE INVENTION

The present invention has been made in consideration of the above-mentioned problems, and the object thereof is to provide a clustered creature exterminating method that can securely exterminate clustered creature such as cyanobacteria in large quantity.

To accomplish the above object, clustered creature exterminating method according to the present invention comprises the steps of: pressurizing a fluid containing a clustered creature; suddenly lowering the pressure applied to the fluid; and destroying a bonding in the clustered creature by a cavitation caused by the pressure drop to exterminate the clustered creature.

In the above method, a pump may pressurize the fluid, and the fluid can be injected from nozzles that are connected to the pump to suddenly lower the pressure applied to the fluid.

It is possible to add another step of colliding the fluid injected from the nozzles to an object, and the step of colliding the fluid injected from the nozzles to an object may be a step of colliding the fluids with each other, the fluids being injected from opposing nozzles with each other. The clustered creature can be cyanobacteria, and the above methods are to be utilized to exterminate cyanobacteria.

Further, it is possible to add the step of inflicting friction loss on the fluids injected from the nozzles with each other, and this step may be caused by the interaction between the fluids injected from the opposing nozzles.

When fluid containing a clustered creature such as cyanobacteria is pressurized by a pump or the like and is injected from nozzles to suddenly lower the pressure of the fluid, the fluid causes a cavitation, which allows the clustered creature to be subject to strong destroying force. As a result, the clustered creature is divided into small pieces to lose energy for maintaining life, leading to death.

Otherwise, when the fluid injected from the nozzles is collided to an object such as a plate, or the nozzles are arranged so as to closely oppose to one another to collide the fluids injected from the both nozzles with each other, physically strong force is applied to the clustered creature in the same manner as described above, and the clustered creature is divided into small pieces to lose energy for maintaining life. When the clustered creature is cyanobacteria and the cyanobacteria are divided into many small pieces, gas cysts in their cells are also destroyed. Thus the cyanobacteria lose the ability to rise, and sink to the bottom of the water, which prevents them from photosynthesizing, resulting in death of the cyanobacteria. In place of the collision, it is also possible to divide the cyanobacteria into small pieces by applying shearing force through friction loss, which is generated when the fluids injected from the plurality of nozzles are rubbed with each other.

With the present invention, continuous processing is possible by using a pump, and increasing the discharge quantity of the pump allows the quantity of fluid in the process to increase, so that a large amount of cyanobacteria can easily be exterminated. Further, the construction of the apparatus used for this method is simple; the mechanical efficiency of the apparatus is high; and clustered creature can be exterminated instantly through a single processing, resulting in very high efficiency of the exterminating system.

BRIEF DESCRIPTION OF THE DRAWINGS

The present invention will be more apparent from the ensuring description with reference to the accompanying drawings wherein.

DETAILED DESCRIPTION OF THE INVENTION

Next, a clustered creature exterminating method according to an embodiment of the present invention will be explained with reference to FIG. 1.

Figure 1:
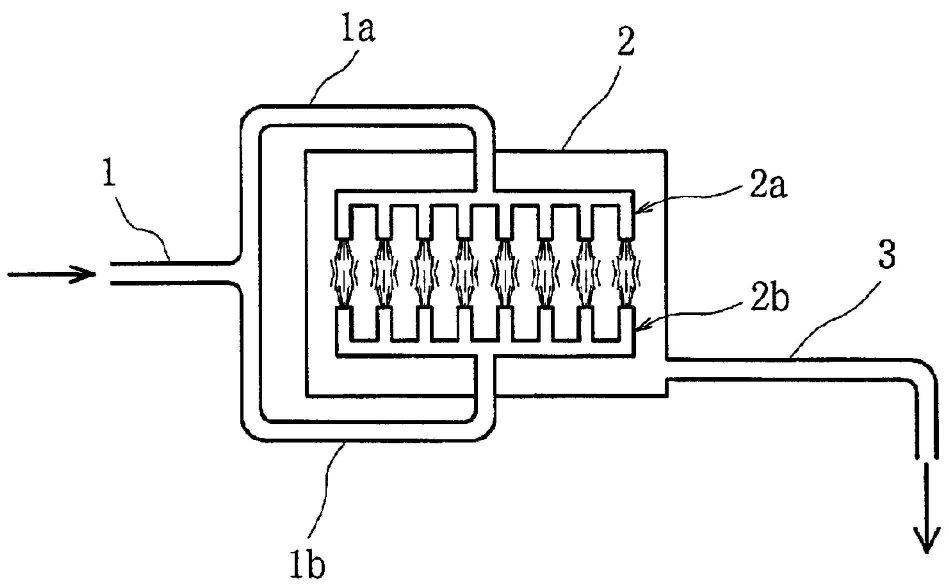
FIG. 1 shows a primary construction of an apparatus used for a clustered creature exterminating method according to the present invention.

In FIG. 1, the first pipe 1 is connected to a pump not shown, and the pump draws water from a pond, a lake or a marsh where cyanobacteria live. The water drawn is pressurized by the pump from 0.3 to 5 MPa, which is a very low pressure compared to the pressure used in conventional apparatuses, and passes through the first pipe 1. At an end of the first pipe 1, the water is divided into two, and substantially half of the water is introduced to a pipe 1*a* and the other half is introduced to a pipe lb. The water from the pipes 1*a* and 1*b* are fed to the inside of a nozzle apparatus 2 from upper and lower portions thereof.

In the nozzle apparatus 2, nozzle groups 2*a*, 2*b* oppose with each other with a clearance of 4 to 40 mm, and each nozzle groups 2*a*, 2*b* is provided with a plurality of nozzles of which diameter is from 1 to 4 mm. The water injected from the opposing nozzle groups 2*a*, 2*b* collide hard with each other in the midway of the nozzle groups 2*a*, 2*b*. To the nozzle apparatus 2 is connected the second pipe 3, and the water after the collision passes through the second pipe 3 to return to the original pond, lake or marsh.

All the tests in which the ranges described above are combined were successful. Generally, it is preferable for mass processing to reduce the pressure as low as possible since much water is obtained by the same energy, and it is preferable to shorten the distance between the nozzle groups 2*a*, 2*b*.

A large number of cyanobacteria are contained in the water of ponds, lakes or marshes. The cyanobacteria are subject to the following actions while they pass the first pipe 1 and the second pipe 3 and return to the original ponds, lakes or marshes.

In the first pipe 1, cyanobacteria reach the nozzle groups 2*a*, 2*b* while being pressurized by the discharge pressure of the pump. Then, when the water is injected from the nozzle groups 2*a*, 2*b*, the discharge pressure of the pump suddenly decreases, so that a cavitation at that moment causes to divide the viscous sheath of the cyanobacteria into many parts, which causes the cluster to be divided into small pieces. And, at the same time, gas cysts in cells of the cyanobacteria are destroyed to lose a float. That is, the cyanobacteria that return to the original ponds, lakes or marshes through the second pipe 3 are not able to rise near the water surface but sink near the bottom of the water. The sunken cyanobacteria are mostly dead. Since the cyanobacteria that are not dead cannot photosynthesize, they will die soon or later.

Cluster of cyanobacteria escaping from the destruction at the injection of the nozzle groups 2*a* or 2*b* collide hard with the water injected from the opposing nozzle groups 2*a* or 2*b*, and the impact at that moment destroys the viscous sheath as well as the gas cyst of the cell.

The impacts in the above two stages divide the viscous sheathes of all the cyanobacteria to make small clusters, and also, gas cysts in the cells are also destroyed. As a result, all of the cyanobacteria contained in the water that passes the second pipe 3 and returns to the original pond, lake or marsh cannot rise but sink near the bottom of the water and die soon or later.

In the present invention, cyanobacteria do not die due to the destruction of their cell walls but die due to the separation of cluster to small pieces. Generally, approximately 200 to 300 MPa is required to destroy the cell wall. On the other hand, the pressure of a pump used for the exterminating method according to the present invention is about 5 MPa at the highest; therefore, it is impossible to destroy the cell wall. As a result, ordinary planktons that do not form a cluster using viscous sheath are not subject to destruction of their cell walls, that is, there is no adverse effect on the ordinary planktons.

The nozzle groups 2*a*, 2*b* of the nozzle apparatus 2 are exemplarily explained, and opposing nozzle groups may be one pair, or the emulsification apparatus disclosed in Japanese Patent No. 2553287 (Japanese Patent Application Laid-open Heisei 6-47264) invented by the inventor of the present invention may be adopted.

Further, in the above embodiment, the fluid injected from opposing nozzles collide with each other, however, as described above, injection from the nozzles only causes the cyanobacteria to be exterminated through the cavitation. In this case, almost doubling the pressure of a pump achieves the same degree of the extermination as obtained when fluid injected from nozzles is subject to frontal collision illustrated in FIG. 1.

Besides, as another exterminating method, it is also possible to exterminate cyanobacteria by arranging only one nozzle group in place of two opposing nozzle groups, and colliding fluid injected from the nozzles to an object such as a plate. In this case, setting the pressure of a pump about time and a half allows the same degree of the extermination as obtained by the apparatus shown in FIG. 1.

In the method shown in FIG. 1, the nozzle groups oppose with each other, and the nozzles are situated with short distance between them to collide fluid injected from the nozzles with each other, so that relative velocity of the fluids at the collision becomes double in comparison to that of the apparatus with a single nozzle group, therefore, pressure required becomes a half.

When using a plate, it generates abrasion. On the other hand, in the method of opposing nozzles, no abrasion occurs. Half pressure described above means that the amount of flowing water, that is, the capacity processing cyanobacteria becomes double. Since the abrasion of the nozzles is inversely proportional to square of the pressure, the life of the nozzles becomes four times longer.

Figure 2:
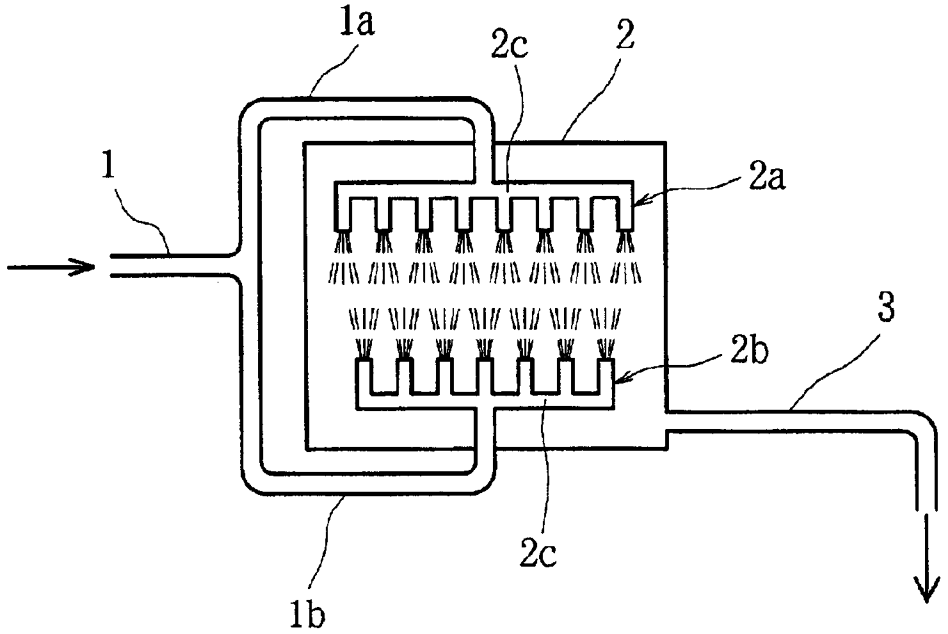
FIG. 2 shows an embodiment in which fluids injected from opposing nozzles are rubbed with each other to exterminate cyanobacteria.

FIG. 2 shows an embodiment in which fluids injected from opposing nozzles are rubbed with each other to exterminate cyanobacteria. In this embodiment, central axes of nozzles of the nozzle group 2*a* shift by about half pitches from central axes of nozzles of the nozzle group 2*b*. That is, fluids injected from the nozzle groups 2*a*, 2*b* are not subject to frontal collision, but the fluids are violently rubbed with each other in the midway.

Then, friction loss caused by the rubbing adds shearing force to cyanobacteria, which allows cyanobacteria to be divided into small pieces. In this case, when the fluid injected from ether one nozzle group of 2*a*, 2*b* reaches the other group, impact of the fluid injected from one group against the other nozzle preferably disappears so as not to wear the nozzles of the other group. This is realized by designing the distance between the nozzle groups 2_a_, 2_b_ long. For instance, the distance between the nozzle groups 2_a_, 2_b_ illustrated in FIG. 1 may be 4 to 40 mm, but that between the nozzle groups 2_a_, 2_b_ illustrated in FIG. 2 can be about 100 to 200 mm.

Further, two nozzle groups not shown may be arranged in such a manner that fluids injected from nozzles of the nozzle groups cross with each other to divide cyanobacteria. In the embodiment shown in FIG. 2, the angle crossing the fluids with each other is 180 degrees. Then, at the point where the fluids cross, jet streams with different velocities rub with each other to add shearing force to cyanobacteria through friction losses, which allows cyanobacteria to be divided. It is a matter of course that the two nozzle groups 2_a_, 2_b_ may be replaced by two nozzle systems of plurality of nozzle groups to obtain the same effect as described above.

The processing apparatus according to the present invention is not limited to the extermination of cyanobacteria but it is applicable to many kinds of clustered creatures.

Next, a test conducted to confirm the above effect of the present invention will be introduced.

As a processing apparatus for the test, a small one of the present applicant was used. The maximum capacity is 10 liters per minute, and to the apparatus is attached the emulsification apparatus disclosed in Japanese Patent No. 2553287 as nozzles. Water tested was sampled about 200 liters from Gongendo-chosei pond in Sugito-cho, Saitama prefecture, Japan.

Next, the water sampled was filtered through a net to remove large foreign matters, and was pressurized by a pump of the small-scale processing apparatus. The pressure of the pump was adjusted to 0.5 MPa, and four nozzles of which holes were 1.1 mm in diameter were arranged in such a manner that two of them opposed the other two with each other while the distance between the opposing nozzles was 4 mm.

Water before and after the processing were separately poured to colorless and transparent glass bottles and were arranged side by side to observe, with eyes as well as a microscope, the conditions with the passage of time.

In the water before processing, cyanobacteria rose one after another and gathered on the water surface as time passed. On the other hand, in the water after processing, the particles of cyanobacteria became small and were deposited as time passed. Sixty minutes later, most of the cyanobacteria were deposited, and 15 hours later the deposition of the cyanobacteria further progressed, so that no cyanobacteria was observed on the water surface, and the water became transparent and limpid.

When observed with a microscope, the water before processing had the cluster of cyanobacteria enclosed by viscous sheath, but the water after processing had no viscous sheath; cyanobacteria in the water were divided into small pieces; and gas cysts thereof were also destroyed and died. Further, a variety of planktons moved around among the processed cyanobacteria. These phenomena show that the clustered creature exterminating method according to the present invention has little effect on ordinary planktons without forming clusters.

As described above, with the present invention, a fluid containing a clustered creature is pressurized; the pressure applied to the fluid is suddenly lowered; and a cavitation caused by the pressure drop destroys a bonding in the clustered creature to separate the clustered creature, therefore, the clustered creature such as cyanobacteria is securely exterminated. In addition, using a pump allows continuous processing, thereby enabling to process a large quantity of fluid in a short period of time.

Further, when a step of colliding the fluid injected from the nozzles to an object is added, even with a low pressure, the boding in the clustered creature can be destroyed, which improves the capacity of the system. In order to collide the fluid to an object, it is possible to collide the fluids with each other by injecting the fluids from the opposing nozzles, which increases relative velocity of the fluids at the collision. As a result, the pressure applied to the fluids at the injection can be set much lower, in other words, the quantity of flowing fluid by the pump can be increased to further increase the processing quantity.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A clustered creature exterminating method comprising the steps of:

pressurizing a fluid containing a clustered creature by an amount of pressure ranging from 0.3 to 5 MPa;

suddenly lowering said pressure applied to the fluid by pressurizing said fluid with a pump and injecting said fluid from a plurality of nozzles connected to the pump;

colliding said fluid injected from the opposing nozzles with one another; and destroying a bonding in said clustered creature by a cavitation caused by the pressure drop to exterminate the clustered creature.

2. The clustered creature exterminating method as defined in claim 1, wherein said clustered creature is cyanobacteria.

3. A clustered creature exterminating method comprising the steps of:

pressurizing a fluid containing a clustered creature by an amount of pressure ranging from 0.3 to 5 MPa;

suddenly lowering said pressure applied to the fluid by pressurizing said fluid with a pump and injecting said fluid from a plurality of nozzles connected to the pump;

inflicting friction loss on the fluids injected from said nozzles with each other by interaction between said fluid injected opposing nozzles; and destroying a bonding in said clustered creature by a cavitation caused by the pressure drop to exterminate the clustered creature.

4. The clustered creature exterminating method as defined in claim 3, wherein said clustered creature is cyanobacteria.

* * * * *